Feb. 25, 1941.     R. H. SPRINK     2,233,329
LEVER
Filed March 24, 1937
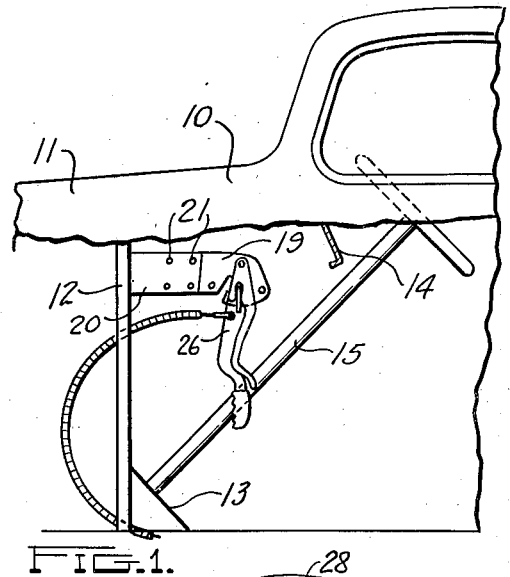
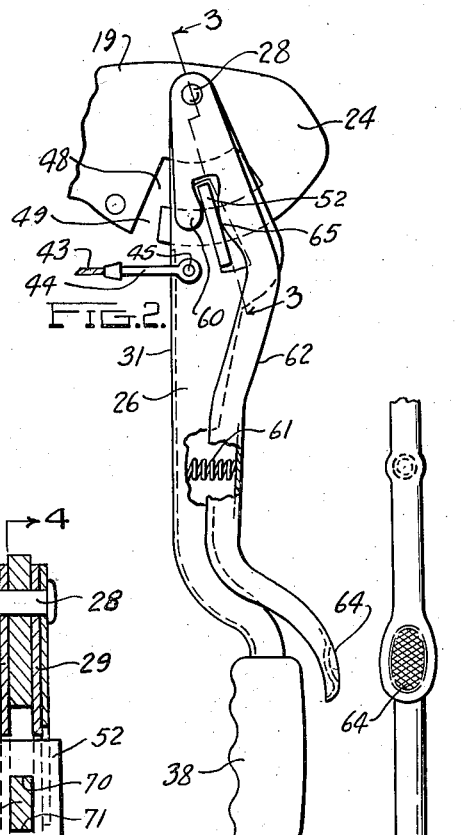
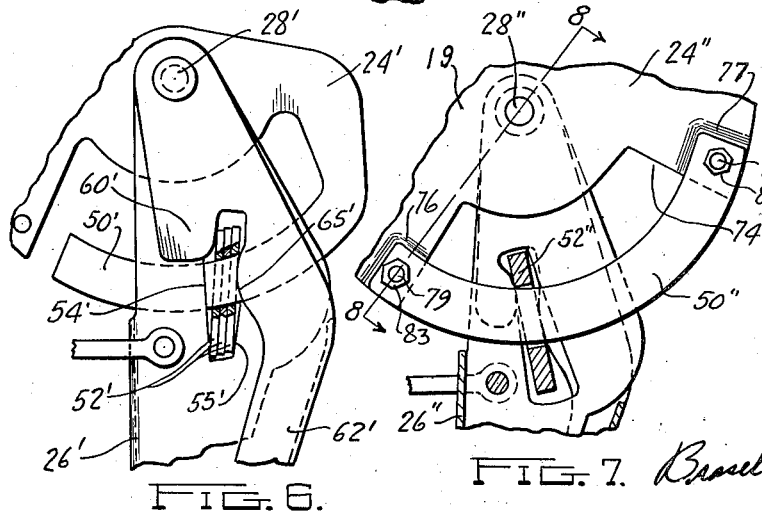
Inventor
Robert H. Sprink

Patented Feb. 25, 1941

2,233,329

UNITED STATES PATENT OFFICE 2,233,329

LEVER

Robert H. Sprink, Toledo, Ohio, assignor, by mesne assignments, to The Bingham Stamping Company, a corporation of Ohio Application March 24, 1937, Serial No. 132,686

12 Claims. (Cl. 74—531)

This invention relates to control mechanism and particularly to a lever mechanism of a type suitably adapted for vehicle control or other apparatus.

The invention contemplates the provision of a lever mechanism embodying a friction clutching means wherein the mechanism may be adjusted and retained in desired position.

The invention has for an object the provision of a lever and clutch arrangement particularly adaptable in controlling the operation of braking mechanisms wherein the extent of movement of the lever to brake setting position may vary under operating conditions, the friction clutching arrangement being of such nature as to retain the lever in any position of adjustment.

A further object of the invention is the provision of a lever arrangement wherein the same may be positively retained in any position and yet may be easily and quickly released with very little effort.

Another object of the invention is the provision of lever mechanism embodying a releasing means which may be co-extensive with a lever and arranged to act directly upon the clutch member.

A further object of the invention is the provision of a lever mechanism wherein the major parts are formed from sheet material thus effecting substantial reduction in the expense of manufacture and assembly and enhancing the uniformity and interchangeability of parts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Fig. 1 is a fragmentary side view of an automotive vehicle, with a portion being broken away to illustrate the mounting of the mechanism control of my invention;

Figure 2 is a side elevational view of a form of the mechanism control of my invention;

Figure 3 is a longitudinal sectional view taken substantially upon the line 3—3 of Figure 2;

Figure 4 is a vertical sectional view taken substantially on the line 4—4 of Figure 3;

Figure 5 is a fragmentary detail view showing the lower portion of the lever and clutch releasing means;

Figure 6 illustrates a modified form of clutch mechanism of my invention;

Figure 7 illustrates a modified construction of the mechanism control shown in Figure 4;

Figure 8 is a sectional view taken substantially upon line 8—8 of Figure 7.

I have illustrated the mechanism control of my invention as particularly utilized as a means of emergency brake control for automotive vehicles, but it is to be understood that I contemplate the employment of the invention in any type of mechanism where the control may have utility.

Referring to the drawing in detail and particularly Figure 1, I have illustrated the forward portion 10 of an automotive vehicle body of conventional design having a cowl portion 11, a dash portion 12, toe board 13, instrument board 14 and steering post or column 15. It has been found desirable to mount a brake control mechanism in such a manner that the same may be conveniently operated by the driver of the vehicle and yet be in a position which will not impede or handicap the vehicle operator. In the embodiment of the invention as illustrated, the control mechanism is preferably mounted adjacent the left side wall of the vehicle body as viewed from the driver's position and is carried by a support or bracket 19 forming a part of the invention and is secured to the cowl frame construction 20 or other suitable portion of the vehicle. The lever support or bracket is preferably mounted rearwardly of the dash board 12 and is held in place by a plurality of rivets 21 or other suitable means passing through openings in the support illustrated in Figure 2.

The bracket 19 in the present embodiment forms a supporting means for the lever member and a clutching surface for the lever retaining means. The lever mechanism includes a lever or lever member 26 which is pivotally carried by the support 19, the latter being preformed with a uniplanar portion 24. The upper extremity of the lever member 26 is formed with parallel side wall portions or projections 29 and 30 which in the embodiment illustrated in Figures 1 through 4 inclusive, are jointed together by an integral lateral flange portion 31 thus forming a U-shaped configuration.

The parallel side wall projections 29 and 30 of the lever member are arranged to straddle the uniplanar portion 24 of the support 19 and are pivotally connected to the support by means of a pin or pintle 28.

In order to facilitate the actuation or manipulation of the lever mechanism, I have provided at the depending extremity of the lever member 26 a hand grip portion 38 which may be fabricated of moulded material such as rubber, phenol condensation product, or one of the usual well known "plastics" or other suitable material which is preferably formed to a configuration providing a grip portion which not only will conveniently accommodate the hand of the vehicle operator, but is of a configuration presenting a pleasing appearance.

A force transmitting means to the brakes or other apparatus to be controlled by the lever mechanism is illustrated in the form of cable 43 or other suitable means may be connected through the medium of a clevis 44 and a pin 45 to the side walls of the lever member 26.

My invention incorporates a clutching means for locking the lever member and associated mechanism in any position at which it may be adjusted and incorporates a simple yet effective releasing means therefor. The uni-planar portion 24 of the bracket 19 is provided with an arcuate slot or opening 48 which terminates in a lateral opening or slot 49 forming an arcuately shaped arm 50. The bounding edges of the arm 50 are preferably generated as radii of different dimension about the axis of the pin 28 as a center. Slidably positioned on the arm 50 is a block or friction clutch member 52 having a rectangular opening to accommodate the arm 50 and yet permit a slight tilting movement of the block.

In the form shown in Figures 1 through 4 inclusive, the clutch block 52 is positioned in a cutaway portion or opening 54 which has a slight enlargement as at 55 to permit slight tilting or oscillating movement of the block 52, the upper edge of the block resting against a wall 57 of the opening in the lever body, in effect, forming a pivotal support for the upper portion of the block 52. It is to be noted that the opening 53 in the clutch block is formed so that when the clutch is in locking position, that is, in the position indicated in Figure 4, the upper and lower walls of the opening are arranged out of a tangent relation to the upper and lower edges of the arcuately shaped arm 50. Thus, to provide a locking or wedging relation between the supporting member and the clutch block, it is preferable to have the walls of the clutch block adjacent the arcuate arm out of parallelism or tangent relation to the support with which the clutch block cooperates.

A clutch releasing or actuating member 62 is provided with depending portions 60 which normally contact with one side wall of the clutch block 52 as indicated in Figures 2 and 4 which tend to hold the upper portion of the clutch block 52 in contact with the wall portion 57 of the opening in the lever body accommodating the clutch block, thus tilting the clutch block to locking position as illustrated in Figure 4. The depending portions 60 are normally urged into contact with the clutch block under the influence of the expansive coil spring 61 interposed between the lever member 26 and the clutch actuating member 62, the latter being preferably pivoted about the pivotal support 28 as illustrated. The clutch actuating member 62 is generally of U-shaped configuration overlapping the side walls of the U-shaped body portion of the lever member 26 and terminates in a finger piece or pad portion 64 so that the clutch actuating means may be quickly and easily manipulated by the thumb of the operator of the vehicle. The clutch actuating member 62 is also provided with aligned curved portions 65 which in effecting a release of the clutch block contacts with the other face or wall of the clutch block to impart tilting movement to the clutch block 52 placing the inner walls of opening 53 in substantial tangential or parallel relation to the upper and lower surfaces of arm 50.

The operation of the form of my invention shown in Figures 1 to 5 inclusive is as follows: When it is desired to "set" the brakes of the vehicle, the operator grasps the grip member 38 rotating the lever member 26 about the pivot point 28 in a counter-clockwise direction, the clutch block 52 following this pivotal movement of the lever member under the influence of the depending portions 60 of the clutch actuating member 62 under the influence of spring 61. When the brakes have been moved to "set" position and the operator removes his hand from engagement with the grip portion 38, the spring 61 resiliently urges the clutch actuating member 62 also in a counter-clockwise direction so that the depending portions 60 thereof contact with one wall of the clutch block 52, swinging the latter to a tilted position such that the edges 70 and 71 of the upper and lower interior walls in the clutch block 52 engage the upper and lower arcuate surfaces of the arm 50 forming an effective frictional engagement serving to lock the lever 26 in adjusted or brake setting position.

In order to unlock the lever 26 and thereby cause the release of the brake mechanism, the operator grasps the grip member 38 of the lever member 26 and by means of the operator's thumb resting upon the finger piece 64, the clutch actuator 62 is moved slightly in a clockwise direction with respect to the lever member 26 causing the aligned curved or cam portions 65 of the clutch actuating member to engage the other wall of the clutch block 52, such movement of the clutch actuating member withdrawing the portions 60 thereof from engagement with the clutch block permitting the latter to tilt slightly under the influence of cam portions 65, thus releasing the interior edge wall portions 70 and 71 of the clutch block 52 from frictional engagement with the surfaces of the arcuate arm 50 so that the lever or lever member 26 may be easily moved in a counter-clockwise direction to effect a release of the brakes.

In the form of the invention shown in Figure 6 the support 24 is similar to the support hereinbefore described and has an arcuately shaped arm 50'. The lever member 26' is pivoted upon a pin 28' and the clutch actuating member 62' is also pivoted upon a pin 28' and the clutch actuating member 62' is also pivoted upon the pin 28'.

The lever member is provided with an opening 54' in which is positioned a plurality of clutch blocks 52' in the form illustrated, there being three in number, which have central openings similar to the opening 53 in the clutch block of the form of the invention illustrated in Figure 4 to accommodate the arcuate arm 50' in the form illustrated, the openings being of rectangular configuration. By using a plurality of blocks 52', the number of frictional edges is increased for contacting the arcuate arm for locking purposes. The clutch blocks 52' in this form of the invention rest in the lower narrowed portion 55' of the opening 54' in the lever member and are, in effect, mounted for pivotal support in this narrowed portion 55' of the opening.

The clutch actuating member 62' is provided with depending portions 60' which engage the upper side wall of one of the clutch blocks 52', the latter in turn contacting the next clutch block and so on through the series of clutch blocks 52' whereby they are urged by the clutch actuating member toward locking position as illustrated in Figure 6 under the influence of a coil spring (not shown) similar to the coil spring 61 as heretofore described in the other form of my invention. The clutch actuating member 62' in this form of the invention is provided with cam portions 65' adapted to contact with the outward face of the end clutch block 52' so that pivotal movement of the clutch actuating or releasing member 62' about the pivot point 28' in a clockwise direction moves the clutch blocks 52' because of their mutual contact with each other out of locking engagement with the arcuate arm 50'.

Figures 7 and 8 show a modified construction of the mechanism control shown in Figures 2 to 5 inclusive, differing from the arrangement therein shown in that the arcuate arm 50'' forms an independent element and is removably secured to the uniplanar section 24'' of the support. In this form of construction as shown in Figure 7 the uniplanar section 24'' is cut away as at 74 and each of the bounding lateral walls is formed with suitable depressions 76 and 77 adapted to receive and accommodate the width of the ends of arm or member 50'' so that the same will be substantially in the same plane as that of the supporting section 24''. In the embodiment illustrated the end portions of the arm 50'' as well as each of the depressions 76 and 77 are provided with aligned openings adapted to receive fastening means as, for example, bolts 78 and 79 provided with a threaded portion cooperating with suitable nuts 81 and 83 for holding member 50'' in tight engagement with the wall sections of the uniplanar portion 24'' of the support 19'' and permitting its removal for purposes of repair or replacement. This construction also permits the hardening of the arm 50 independently of the support 24'' and the fact that the arm 50'' can be removably mounted on the lever support facilitates the manufacture and assembly of component parts of the control mechanism. In this form, as well as in the form disclosed in Figures 2 to 4, the arm 50'' has a center of curvature which preferably coincides with the pivotal point of the lever member 26'' as well as of the clutch releasing member 62''. Cooperating with the arm 50'' is the clutch block 52'' similar in construction and which is arranged in similar manner as that disclosed in the embodiment shown in Figures 2 to 4 inclusive. I have found it highly advantageous that the cooperating clutch surfaces, viz., those of the clutch block and the arm be hardened so as to decrease wear of the parts and the construction shown in Figure 7 facilitates the hardening of the arm independently of the support of the lever mechanism.

Through the use of my invention the brakes may be set in any desired position and the clutch block or blocks will retain the lever member in adjusted or locked position, and yet provide a simple and effective means for releasing the lever member and brake mechanism without undue wear upon the cooperating clutch surfaces.

It is apparent that within the scope of the invention, modifications and different arrangements may be made other than is herein disclosed, and the present disclosure is illustrative merely, the invention comprehending all variations thereof.

What I claim is:

1. In combination, a control mechanism including a support; an arcuate arm carried by said support; a member embracing said arm; a lever connected to said support and associated with said member for moving the same; an element connected to said support and mounted for relative movement with respect to said lever for causing movement of said member with respect to said lever and arcuate arm; spring means cooperating with the lever for urging said element into engagement with said member.

2. In combination, a control mechanism including a support having an arcuate arm; a member slidably mounted on said arm and adapted upon tilting movement to frictionally engage said arm; a lever connected to said support and associated with said member for moving the same on said arm; an element connected to said support and movable with said lever and adapted to cause tilting movement of said member with respect to said lever to lock the lever in adjusted position; and spring means cooperating with the lever for urging said element into engagement with said member.

3. In combination, a control mechanism including a support having an arcuately shaped arm; a clutch block having an opening therein through which said arm projects; a lever member pivotally carried upon said support and having an opening therein to accommodate said clutch block; a clutch actuating member associated with said lever member and capable of relative movement with respect thereto, said clutch actuating member having a surface portion adapted to contact with said clutch block; spring means cooperating with said clutch actuating member and said lever member for resiliently urging said clutch block to locking position, said clutch actuating member having another portion adapted for engagement with said clutch block for effecting a release of frictional engagement with said clutch block and said arm upon relative movement of said clutch actuating member with respect to said lever member.

4. In combination, a control mechanism including a support having an arm; a clutch block having an opening therein through which said arm projects; a lever member formed of sheet metal having a U-shaped configuration pivotally carried upon said support and having an opening therein to accommodate said clutch block; a clutch actuating member formed of sheet metal associated with said lever and capable of relative limited pivotal movement with respect thereto, said clutch actuating member having a surface portion adapted to contact with said clutch block; means cooperating with said clutch actuating member for urging through said surface portion said clutch block to locking position, said clutch actuating member having another surface portion adapted for engagement with said clutch block for effecting a release of frictional engagement with said clutch block and said arm upon relative movement of said clutch actuating member with respect to said lever member.

5. In combination, a control mechanism including a support having an arm; a clutch block having an opening therein through which said arm projects; a lever member carried upon said support and having an opening therein to accommodate said clutch block providing a tilting movement with respect to said lever; a clutch actuating member associated with said lever and capable of relative movement with respect thereto, said clutch actuating member having a portion adapted for engagement with said clutch block for tilting the same on said arm upon relative movement of said clutch actuating member with respect to said lever member; and spring means cooperating with said clutch actuating member and said lever member for resiliently urging said clutch block to tilting locking position.

6. In combination, a control mechanism including a support; an arcuately shaped element removably carried by said support; a member embracing said arcuately shaped element; a lever connected to said support and associated with said member; means connected to said support and mounted for relative movement with respect to said lever for causing movement of said member with respect to said lever and arcuately shaped element; and a spring cooperating with the lever for urging said means into engagement with said member.

7. In combination, a control mechanism including a support having an arcuate portion; a lever pivotally connected to the support, said lever having a slot; a clutch block movable on the arcuate portion of the support and positioned in the slot in said lever; a member associated with said lever and having a surface engageable with the clutch block; spring means normally urging said member into engagement with the clutch block to effect a locking between the clutch block and the arcuate portion of said support for retaining the lever in predetermined position, said member having a second surface adapted for engagement with the clutch block upon relative movement of said member with respect to the lever for effecting a release of the clutch block with the arcuate support.

8. In combination, a control mechanism including a support having an arcuate portion; a lever formed of sheet metal having portions straddling and pivotally connected to the support; a clutch block movable on the arcuate portion of the support and arranged in aligned slots in the side walls of said lever; a member pivotally associated with said lever, said member having a surface engageable with the clutch block; and spring means normally urging said member into engagement with the clutch block to effect a locking between the clutch block and the arcuate portion of said support for retaining the lever in predetermined position, said member having a second surface adapted for engagement with the clutch block upon relative movement of said member with respect to the lever for effecting a release of the clutch block with the arcuate support.

9. In combination, a control mechanism including a support having an arcuate portion; a lever pivotally connected to the support; a clutch block movable on the arcuate portion of said support carried in an opening formed in said lever, said block being capable of tilting movement with respect to the lever to effect a frictional engagement between said block and the arcuate portion to hold the lever in predetermined position; a clutch releasing member pivotally articulated with said lever and adapted for direct engagement with said clutch block; and spring means directly engageable with said clutch releasing member for normally tilting the clutch block into frictional engagement with the arcuate portion.

10. In combination, a control mechanism including a support provided with an arcuate portion; a lever of U-shaped configuration formed of sheet metal pivotally connected to the support; a clutch block carried by the lever movable on the arcuate portion of the support, said block being capable of tilting movement with respect to the lever to effect a locking engagement between said block and the arcuate portion of said support to retain the lever in predetermined position; a member pivotally articulated with said lever; a cam surface carried by said member adapted to engage said block for urging the latter toward a locking position with the arcuate portion of the support; and a second cam surface carried by said member adapted to engage the clutch block to effect a release of the latter from the arcuate portion of the support.

11. In combination, a control mechanism including a support having an arcuate portion; a lever of U-shaped configuration formed of sheet metal pivotally connected to the support and having portions straddling said arcuate portion; a clutch block movable on the arcuate portion of said support carried in an opening formed in said lever, said block being capable of tilting movement in the opening formed in said lever to effect a locking engagement between said block and said arcuate portion to hold said lever in predetermined position; and means engageable with said block for tilting the latter into frictional engagement with said arcuate portion to lock the lever in position, said means being formed of sheet metal and being capable of relative pivotal movement with respect to said lever to effect a release of said clutch block.

12. In a control mechanism for a brake applying member, the combination of a fixed bracket, a bar secured to said bracket, an operating member comprising a manually operable lever having a plurality of wall portions, a pair of opposite wall portions of said lever having alined openings receiving a locking member for tiltable reception therein whereby the locking member is moved with said lever, said locking member having an enlarged opening receiving said bar, portions of the walls of the locking member opening forming opposed bar gripping surfaces, means for connecting the operating member to the brake applying member so that upon application of the brake the locking member is canted relative to said bar to lock said operating member and said bar against relative movement in the brake releasing direction, said manually operable lever being pivotally secured to said bracket for shifting the locking member along the bar when subjected to movement about said pivot, said bar extending in a curved path corresponding substantially to the path of shiftable movement of said locking member, and means for uncanting the locking member to release the lever from the bar whereby to permit release of the brake.

ROBERT H. SPRINK.